United States Patent
Cate et al.

(10) Patent No.: US 6,755,452 B2
(45) Date of Patent: Jun. 29, 2004

(54) ENERGY ABSORPTION UNIT

(75) Inventors: Peter J. Cate, Blockley (GB); Pádraig Naughton, Schmitten-Dorfweil (DE)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/205,952

(22) Filed: Jul. 26, 2002

(65) Prior Publication Data

US 2003/0034658 A1 Feb. 20, 2003

(30) Foreign Application Priority Data

Aug. 8, 2001 (GB) .............................................. 0119357

(51) Int. Cl.⁷ .............................................. B60R 19/03
(52) U.S. Cl. ...................................... 293/120; 293/133
(58) Field of Search ................................ 293/109, 110, 293/120, 132, 133, 136

(56) References Cited

U.S. PATENT DOCUMENTS

| | | | |
|---|---|---|---|
| 3,784,182 A | 1/1974 | Sobel | 267/140 |
| 3,917,332 A | 11/1975 | Puleo | 293/63 |
| 4,648,923 A | 3/1987 | Chapnick | 156/82 |
| 5,435,619 A | 7/1995 | Nakae et al. | 296/189 |
| 6,213,540 B1 * | 4/2001 | Tusim et al. | 293/109 |
| 6,435,577 B1 * | 8/2002 | Renault | 293/120 |
| 2002/0121787 A1 | 9/2002 | Tarahomi et al. | 293/120 |

FOREIGN PATENT DOCUMENTS

| | | | |
|---|---|---|---|
| GB | 1547764 | 8/1975 | B60R/19/08 |
| GB | 2151993 A | 12/1984 | B60R/19/22 |
| GB | 2322602 A | 2/1997 | B60R/19/26 |
| WO | 99/00236 | 1/1999 | B29C/44/46 |

OTHER PUBLICATIONS

"Plastics Handbook", 1994, McGraw–Hill, Inc., pp. 181–184.*
Derwent Abstract 2001–293369, Staines et al., Ford Global Technologies, WO–200128818.
Derwent 1999–528755–EP–9477274A1; Dynamit Nobel Kunst Gmbh.
Derwent 1983–748104–DE–3224979; Daimler–Benz AG.

* cited by examiner

Primary Examiner—Jason Morrow
(74) Attorney, Agent, or Firm—Norman L. Sims

(57) ABSTRACT

An energy absorbing unit for use as a vehicle bumper having an upper zone and a lower zone wherein the upper zone comprises an inner relatively high density foam material for protecting a structural part of the vehicle by absorbing energy in a direction generally longitudinal of the vehicle and an outer relatively low density foam material for providing protection against impact for a body by absorbing energy during impact. The lower zone includes a foam material having a density intermediate that of the foam materials in the inner and outer areas of the upper zone.

12 Claims, 1 Drawing Sheet

ENERGY ABSORPTION UNIT

TECHNICAL FIELD OF THE INVENTION

This invention relates to an article made of a thermoplastic foam, in particular an energy absorption unit suitable for use in absorbing energy transferred during an impact between two bodies and especially an automobile energy absorbing unit, for example a vehicle bumper.

BACKGROUND OF THE INVENTION

An energy-absorbing unit (EAU) typically forms part of or is attached to an article to provide a means of reducing damage to the article during impact with a body and also often to reduce damage to the body. When employed as a vehicle bumper, an EAU suitably acts to reduce damage both to the vehicle and also to the body with which impact is made.

In recent years, plastic automobile EAUs have been employed in conjunction with conventional metal automobile bumpers to absorb low energy (lower speed) impacts. Energy absorption units employed as vehicle bumpers typically have a bumper fascia moulding on one side, usually composed of a core material of a plastic foam and a surface material of a synthetic resin enclosing the foam core and are usually mounted forward of a stiff cross beam. The foam core material is an important component part which affects the performance of an automobile EAU, and is generally required to have excellent energy absorbing properties and may require dimensional recovery. Further, to decrease the weight of an automobile, the EAU core material should be of low density.

Plastic materials which have been proposed for the foam core material include polyurethane, polyethylene bead, polystyrene and polypropylene bead foams. A conventional automobile EAU core of foamed olefinic polymer is typically prepared by feeding expandable beads of a polypropylene-type resin in a mould capable of enclosing the particles but allowing escape of gases therefrom, and heating the expandable beads at a temperature at which the beads expand and soften and melt-adhere to each other into a mass, whereby a foamed molded article expanded to the same shape and size as the cavity of the mould is formed. An automobile EAU core prepared from beads of a polypropylene type resin foam suitably has a foam density from 16 $kg/m^3$ to 160 $kg/m^3$ to achieve an average compressive stress of about 50 kPa to 1000 kPa at 25% compression

PRIOR ART

Vehicle bumpers which have a number of sections of differing absorption characteristics have been known for many years. For example DE 3224979A, published in 1983, discloses a bumper having three sections of differing elasticity. EP 947727A discloses an energy absorbing foam having two parallel layers with different energy absorbing characteristics. The system may be used in bumpers and reference is made to polypropylene, polystyrene and polyurethane foams.

However, current vehicle bumper systems are not specifically designed to take account of pedestrian impact in combination with the other types of impact in which the vehicle may be involved. For example, vehicle bumpers may be produced from steamchest moulded expanded polypropylene foam in beaded form which perform adequately in certain types of impact but which may be too stiff or too soft in relation to other types of impact and so do not provide optimum performance across the full range of different types of impact.

There is a continuous need for improvement in the safety of pedestrians and other road users by reducing the incidence of death and the severity of injury due to collisions with automobiles. Whilst aiming to improve pedestrian safety, it is also desirable to provide improved protection for the vehicle against low speed impacts and also reducing and desirably minimizing damage to the structure of the vehicle by way of protecting the vehicle chassis or other structural parts, so-called insurance impact protection

SUMMARY OF THE INVENTION

We have now found that an energy absorbing unit having a combination of energy absorbing characteristics which provide excellent impact protection for pedestrians, especially knee and lower leg impact, in combination with low speed impact protection and "insurance" impact protection may be provided by a unit formed from a thermoplastic foam material having a plurality of zones with different energy absorbing characteristics arranged in a particular manner.

DETAILED DESCRIPTION OF THE INVENTION

Figure 1:
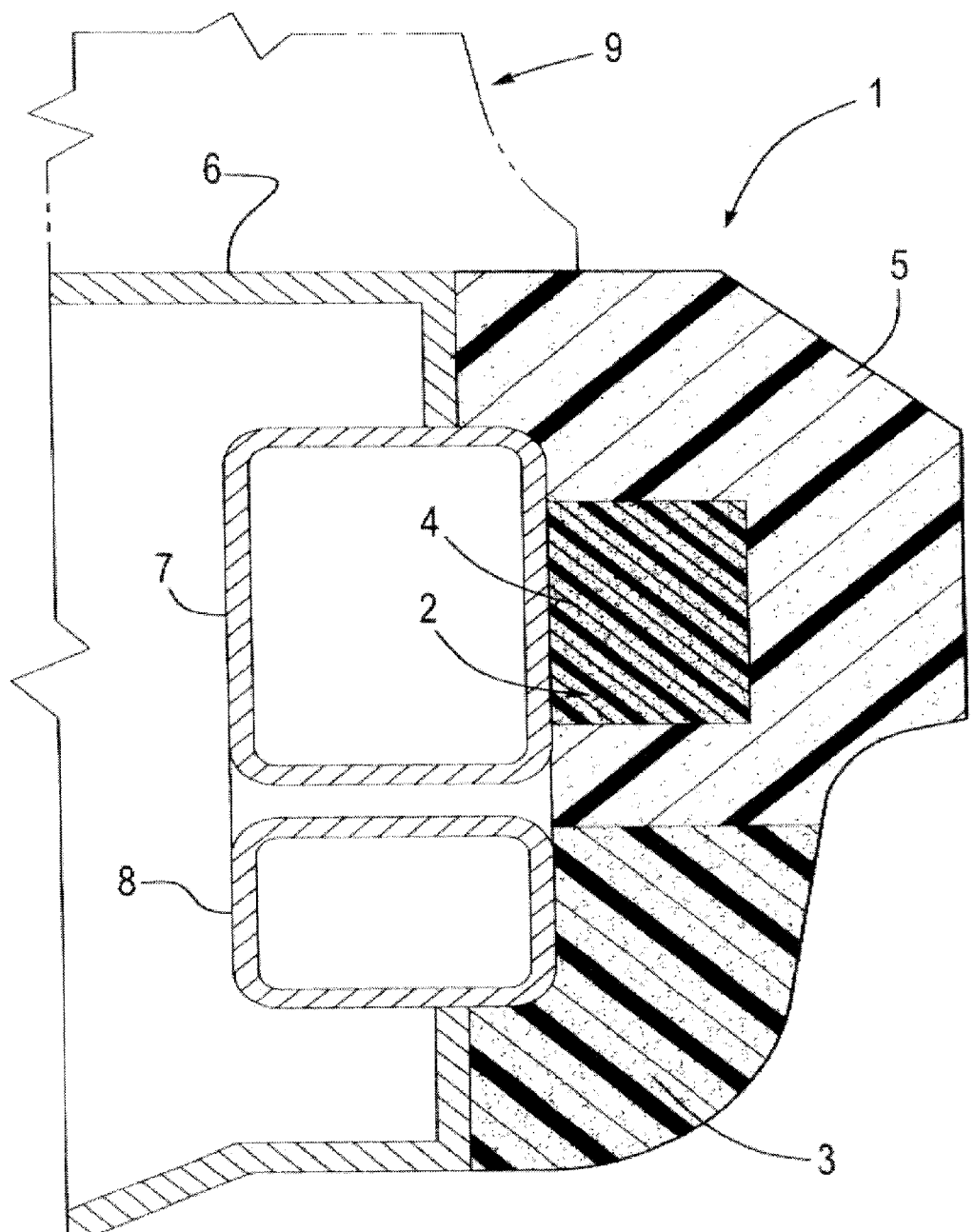
FIG. 1 illustrates a cross-section of a preferred embodiment of an EAU according to the invention.

Accordingly, the invention provides in a first aspect an energy absorbing unit for use as a vehicle bumper comprising a thermoplastic material, the unit comprising at least an upper zone and a lower zone wherein the upper zone comprises an inner relatively high density foam material for protecting a structural part of the vehicle, for example a chassis, by absorbing energy during an impact in a direction generally longitudinal of the vehicle and an outer relatively low density foam material for providing protection against impact for a human or animal body by absorbing energy during impact and wherein the lower zone comprises a foam material having a density intermediate that of the foam materials in the said inner and outer areas of the upper zone.

The lower zone is made of a foam material which also provides protection for the knee and lower leg of a pedestrian or other road user. Its intermediate density is able to push the lower portion of the leg forwards, working in conjunction with the lower density part of the upper zone to minimise the amount of bending experienced by the knee joint so providing enhanced protection for pedestrians during impact.

Accordingly, the EAU has a combination of absorption characteristics provided by different density materials disposed in specified zones which provide an optimum combination of impact protection performance for different types of impact.

The characteristics of the EAU according to the present invention enable vehicles to be produced which provide excellent protection for pedestrians against vehicle impact and protection for the vehicle under low speed impact and additionally provide "insurance" impact protection. A further aspect of the invention provides a vehicle comprising an energy absorption unit according to the present invention.

In a preferred embodiment, at least one of the foam materials employed in the inner area or outer area of the upper zone or the lower zone comprises an anisotropic thermoplastic foam. More preferably, the foam materials employed in the inner and outer area and the lower zone all comprise an anisotropic thermoplastic foam which is aligned in a direction generally longitudinal of the vehicle. The EAU, for example a vehicle bumper, is suitably constructed so the anisotropic foam is preferably aligned parallel to or substantially parallel to the expected direction of impact, typically the longitudinal axis of the vehicle, thereby providing advantageous impact protection.

Orientation to produce the anisotropic thermoplastic may be produced by any known technique for example, by extruding the foamable thermoplastic. The materials from which desirably the inner and outer area of the upper zone and the lower zone are formed and the process parameters for forming them, for example temperatures and extrusion rate, are selected so that the thermoplastic foam has a density of less than 320 kg/m$^3$, preferably from 16 kg/M$^3$, to 192 kg/m$^3$ more preferably 16 kg/m$^3$ to 160 kg/m$^3$, and most preferably from 16 kg/m$^3$ to 128 kg/m$^3$. The resulting extrudates exhibit anisotropic compressive properties, with the highest compressive stresses generally being observed in the extrusion direction of at least about 170 kPa at about 25% compression as measured in accordance with ASTM D3575-93 (Suffix D).

The density of the materials from which the inner and outer area of the upper zone and the lower zone are formed will depend upon the design of EAU which will itself depend upon the type of vehicle in which the EAU is to be employed provided that the density of the thermoplastic foam of the lower zone is higher than that of the thermoplastic foam of the outer area and lower than that of the inner area of the upper zone. In a preferred embodiment, the outer area of the upper zone suitably comprises a thermoplastic foam having a density of 16 to 40 kg/m$^3$, the inner area of the upper zone suitably comprises a thermoplastic foam having a density of 40 to 164 kg/m$^3$ and especially 40 to 128 kg/m$^3$ and the lower zone suitably comprises a thermoplastic foam having a density of 16 to 164 kg/m$^3$ and especially 16 to 128 kg/m$^3$ and provided that the density of the thermoplastic foam of the lower zone is higher than that of the outer area of the upper zone and is lower than that of the inner area of the upper zone.

An especially preferred material for use in the construction of the EAU according to the invention is an anisotropic thermoplastic foam as described in U.S. Pat. No. 6,213,540 B1, the disclosure of which is hereby incorporated by reference.

Suitable foamable thermoplastics for use in the present invention include polyethylene, including low density polyethylene and high density polyethylene (HDPE), polypropylene, and co-polymers of ethylene or propylene and a monoethylenically unsaturated monomer copolymerizable therewith. The thermoplastic for the lower zone, the inner area of the upper zone and the outer area of the upper zone may be the same class of material or different and suitably are selected independently. Examples include copolymers of ethylene and acrylic acid or methylacrylic acid and $C_{1-4}$ alkyl esters or ionomeric derivatives thereof; ethylene vinyl-acetate copolymers; ethylene/carbon monoxide copolymers; anhydride containing olefin copolymers of a diene; copolymers of ethylene and an alpha-olefin having ultra low molecular weight (i.e. densities less than 0.92 g/cc); and blends of these materials. In a preferred embodiment of the invention, the anisotropic foam employed in at least one of the inner area, outer area or lower zone comprises polypropylene. More preferably the foam employed in the inner area, outer area and lower zone comprises polypropylene.

If desired, anisotropic material employed in any one or more areas maybe combined with isotropic material for example expanded polypropylene bead foam and polyurethane foam.

The anisotropic thermoplastic provides excellent energy absorption characteristics especially when aligned in or close to the direction to that of the anticipated impact force. Suitably, the thermoplastic material, preferably anisotropic thermoplastic material, absorbs the energy of the impact by crushing, buckling and/or shearing. In particular the structure of the anisotropic foam and alignment in the EAU provide high levels of energy absorption compared to known EAU's, at similar densities, because of the combination of lower, intermediate and higher density thermoplastics and their relative positions within the EAU.

The extruded anisotropic thermoplastic materials suitable for use in this invention may be cut or thermoformed or otherwise machined into the desired shape of the EAU in which it is used. Alternatively, the energy absorbing article may be comprised of a plurality of components which are joined, such as by hot air welding, steam welding, radio frequency welding, adhesives, mechanical fasteners, or the like, to form a composite energy absorbing article. Also, composite articles containing materials other than the thermoplastic foam may be prepared.

In a preferred method of making the EAU of the present invention, the thermoplastic foams which constitute the inner and outer areas of the upper zone and of the lower zone are suitably thermoformed or cut to the desired shape. It is especially preferred that the EAU is formed by thermoforming together materials of different densities in the desired arrangement to create an EAU according to the invention.

Preferably, the method for making the EAU comprises forming thermoplastic preforms of relatively low density, relatively high density and density intermediate of the low and high density preforms, cutting or shaping the preforms to a pre-determined shape, heating the preforms, assembling the preforms in a thermoforming tool in a configuration corresponding to the required shape of the energy absorbing unit and compressing the preforms whereby they join together to form the energy absorbing unit. The thermoplastic foams employed in the present invention are desirably prepared by a method as disclosed in U.S. Pat. No. 6,213,540 B1.

In an especially preferred embodiment, planks of the extruded anisotropic foam are produced having the desired density. The planks suitably are then cut to the desired size and shape according to the design of the EAU and corresponding to a horizontal cross-section of the EAU to be produced. Preferably the cut planks of thermoplastic are then stacked and thermoformed to bond the shaped planks together to form an article for use as an EAU in vehicle bumpers.

Specific conditions for the thermoforming process are selected, for example using the teaching of U.S. Pat. No. 6,213,540 B1, having regard to particular factors including the design and thickness of the preform or shaped plank and the type of thermoplastic to be used. By way of illustration, a preform or shaped plank comprising polypropylene may be heated, for example in a radiant oven, to a temperature of 130 to 160 C. until it softens and then placed in a thermoforming tool at around ambient temperature and compressed at low pressure, for example 1 to 4 bar to produce the EAU.

In FIG. 1, an EAU according to the invention (1) comprises an upper zone (2) and a lower zone (3). The upper zone (2) comprises two parts, an inner area (4) and an outer area (5). The inner area (4) is composed of a thermoplastic foam having a relatively high density to provide protection for the structural part, for example chassis, (6) of the vehicle. The outer area (5) is composed of a thermoplastic foam of relatively low density to provide low speed impact protection. The lower zone (3) is suitably also composed of a thermoplastic foam of density intermediate that of the inner area (4) and the outer area (5).

The upper zone (2) and lower zone (3) are suitably attached to a bumper beam (7) and a lower rail (8) respectively of a vehicle (9) by conventional means.

Preferably the upper zone (2) and lower zone (3) are produced by extruding a thermoplastic, desirably polypropylene, so as to provide anisotropic properties and the extruded sheet is then cut into shapes representing a horizontal cross section of the EAU (1) such that direction of extrusion is parallel to the longitudinal axis of the vehicle (9) when the EAU (1) is mounted on it.

In a further preferred embodiment of the invention, the thermoplastic foam of the outer area (5) has a generally "C" shaped vertical cross-section and the thermoplastic foam defining the inner area (4) has a generally square or rectangular cross-section. The thermoplastic foam defining the lower zone (3) of the EAU (1) is shaped such that the face of it abuts the front and preferably also the bottom or top face of the lower rail (8). The lower zone (3) and the upper zone (2) are shaped to have complementary surfaces and preferably are joined along a generally horizontal plane.

What is claimed is:

1. An energy absorbing unit for use as a vehicle bumper comprising a thermoplastic material, the unit comprising at least an upper zone and a lower zone wherein the upper zone comprises an inner relatively high density foam material for protecting a structural part of the vehicle by absorbing energy during an impact in a direction generally longitudinal of the vehicle and an outer relatively low density foam material for providing protection against impact for a human or animal body by absorbing energy during impact and wherein the lower zone comprises a foam material having a density intermediate that of the foam materials in the said inner and outer areas of the upper zone.

2. The energy absorbing unit according to claim 1 in which at least one of the foam materials employed in the inner area or outer area of the upper zone or the lower zone comprises an anisotropic thermoplastic foam.

3. The energy absorbing unit according to claim 1 in which the foam materials employed in the inner and outer area of the upper zone and the lower zone all comprise an anisotropic thermoplastic foam which is aligned in a direction generally longitudinal of the vehicle.

4. The energy absorbing unit according to claim 1 in which the thermoplastic foam in the inner and outer area of the upper zone and the lower zone has a density of less than 320 kg/m$^3$.

5. The energy absorbing unit according to claim 4 in which the thermoplastic foam in the inner and outer area of the upper zone and the lower zone has a density from 16 kg/m$^3$, to 192 kg/m$^3$.

6. The energy absorbing unit according to claim 1 in which the relatively high density thermoplastic foam material in the inner area of the upper zone has a compressive stress of at least 170 kPa at 25% compression as measured in accordance with ASTM D3575-93 (Suffix D).

7. The energy absorbing unit according to claim 1 in which the thermoplastic foam material is selected independently for the lower zone, the inner area of the upper zone and the outer area of the upper zone from low density polyethylene, high density polyethylene, polypropylene and co-polymers of ethylene or propylene and a monoethylenically unsaturated monomer copolymerizable therewith.

8. The energy absorbing unit according to claim 7 in which the thermoplastic foam material employed in at least one of the inner area, outer area or lower zone comprises polypropylene.

9. The energy absorbing unit according to claim 8 in which the thermoplastic foam employed in the inner area, outer area and lower zone comprises polypropylene.

10. A vehicle comprising an energy absorption unit as defined in claim 1.

11. A method of making an energy absorbing unit according to claim 7 comprising forming a thermoplastic preforms of relatively low density, relatively high density and density intermediate of the low and high density preforms, cutting or shaping the preforms to a predetermined shape, heating the preforms, assembling the preforms in a thermoforming tool in a configuration corresponding to the required shape of the energy absorbing unit and compressing the preforms whereby they join together to form the energy absorbing unit.

12. The method of making an energy absorbing unit according to claim 11 in which the preforms comprise planks of extruded anisotropic foam which are shaped to correspond to a horizontal cross-section of the energy absorbing unit to be produced, and wherein the shaped planks are stacked and thermoformed to bond the planks together to form an energy absorbing unit.

\* \* \* \* \*